United States Patent
Lu et al.

(10) Patent No.: US 8,291,203 B2
(45) Date of Patent: Oct. 16, 2012

(54) USING A LIVE OPERATING SYSTEM TO SET UP AND CONFIGURE AN ACTIVE MANAGEMENT TECHNOLOGY DEVICE

(75) Inventors: Kecheng Lu, Shanghai (CN); Fang Xiao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1047 days.

(21) Appl. No.: 11/726,188

(22) Filed: Mar. 21, 2007

(65) Prior Publication Data
US 2008/0235502 A1 Sep. 25, 2008

(51) Int. Cl.
*G06F 15/177* (2006.01)

(52) U.S. Cl. ............................................. 713/1

(58) Field of Classification Search .................. 713/1
See application file for complete search history.

(56) References Cited

U.S. PATENT DOCUMENTS

| 6,012,088 | A  | * | 1/2000 | Li et al. ........................ 709/219 |
| 6,681,324 | B1 | * | 1/2004 | Anderson ........................ 713/1 |
| 6,898,705 | B2 | * | 5/2005 | Abboud et al. ............... 713/100 |
| 7,577,722 | B1 | * | 8/2009 | Khandekar et al. .......... 709/220 |
| 7,580,701 | B2 | * | 8/2009 | Ross et al. .................... 455/411 |

* cited by examiner

*Primary Examiner* — Kim Huynh
*Assistant Examiner* — Eric Chang
(74) *Attorney, Agent, or Firm* — Trop, Pruner & Hu, P.C.

(57) ABSTRACT

An active management technology device may be provisioned using a live operating system stored on a disk, in one embodiment. After disk insertion, no further operator involvement may be needed in some cases.

11 Claims, 2 Drawing Sheets

USING A LIVE OPERATING SYSTEM TO SET UP AND CONFIGURE AN ACTIVE MANAGEMENT TECHNOLOGY DEVICE

BACKGROUND

This relates generally to active management technology.

Active management technology, available from Intel Corporation, Santa Clara, Calif., allows network administrators to discover, heal, and protect their networked computing assets. See Intel® Active Management Technology Deployment and Reference Guide, Version 1.0, October 2006, available from Intel Corporation, Santa Clara, Calif. It uses transport layer security (TLS), Hypertext Transfer Protocol (HTTP) Digest Authentication, Kerberos Authentication, access-controlled storage, session keys, and a random number generator to deploy these capabilities in a secure way.

The active management technology is set up and configured in a relatively careful way. Conventional setup generally requires an information technology technician to input several pieces of information manually, including the HTTP digest password and the provisioning pass phrase (PPS)/provisioning identifier (PID) pair.

DETAILED DESCRIPTION

In accordance with one embodiment of the present invention, an active management technology device may be set up and configured by creating a live operating system (OS) compact disk. A live OS is a complete solution, on a disk, for using a computer without operating a hard drive. It may contain a customized, full fledged operating system, such as, for example, the Linux LiveDistro, such as Ubuntu which has the ability to boot itself from a compact disk. The compact disk may also include the Host Embedded Controller Interface (HECI) device driver for the operating system. In the example just described, the device driver might be the Linux HECI driver. In addition, the disk includes a set up and configuration client (SCC) application that communicates with an active management technology set up and configuration application (SCA) to retrieve the needed parameters and to provision the active management technology device locally through the HECI driver. Finally, the compact disk may include a script to automate the provisioning process after the live operating system boot up.

Figure 1:
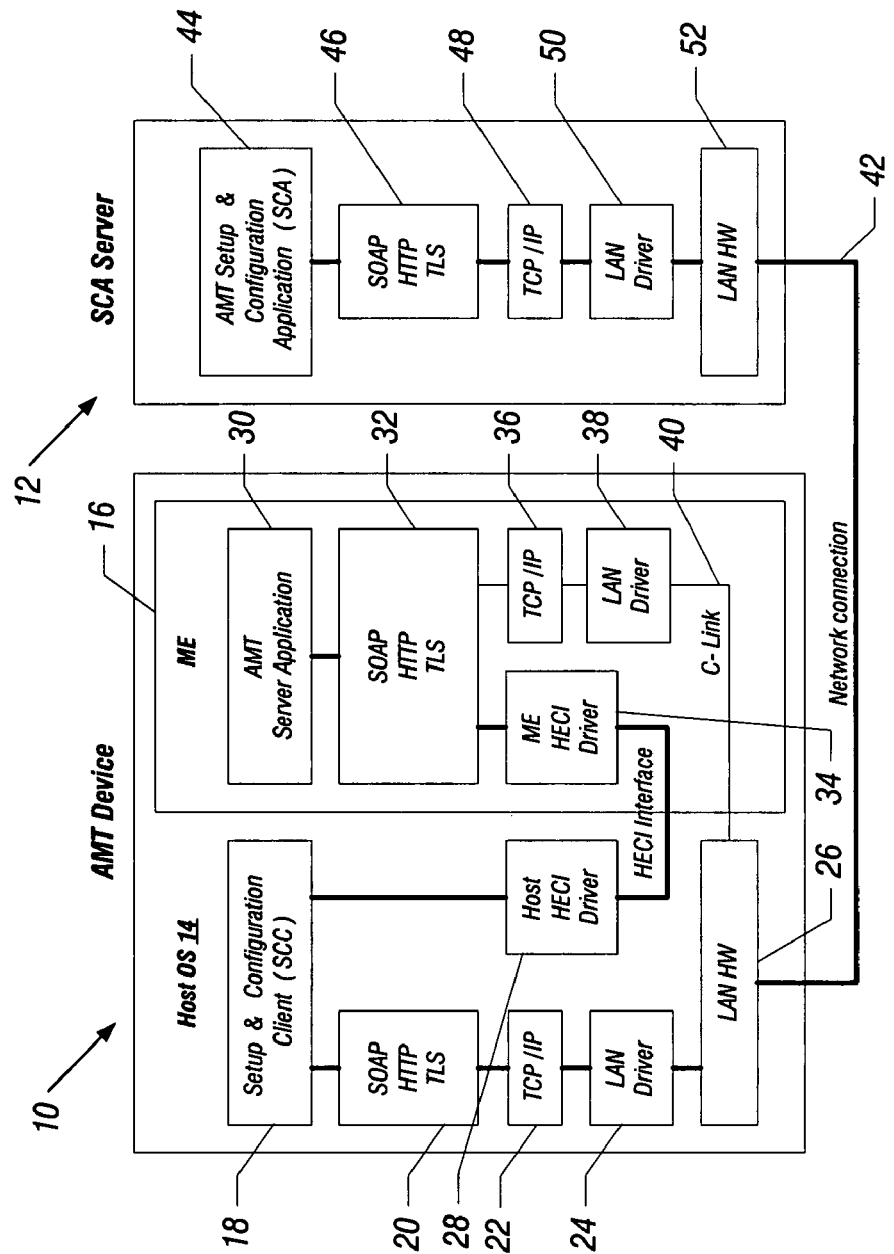
FIG. 1 is a system architecture in accordance with one embodiment of the present invention.

Referring to FIG. 1, the active management technology device 10 communicates through a network connection 42 with a set up and configuration application server 12. The active management device 10 includes a host operating system 14 and an active management technology management engine 16. The engine 16 includes the server application 30 and the simple object access protocol (SOAP), HTTP and transport layer security (TLS) module 32. Connected to the module 32 is the HECI driver 34 and TCP/IP module 36. A LAN (local area network) driver 38 couples by a communication interface 40 to the local area network hardware 26 of the host operating system 14.

The host operating system 14 includes a set up and configuration client 18, its SOAP, HTTP, and TLS module 20, and its own Transmission Control Protocol (TCP)/Internet Protocol (IP) module 22, as well as its own LAN driver 24. The host also includes an HECI driver 38, coupled by an HECI interface to the HECI driver 34 of the management engine (ME) 16.

Figure 2:
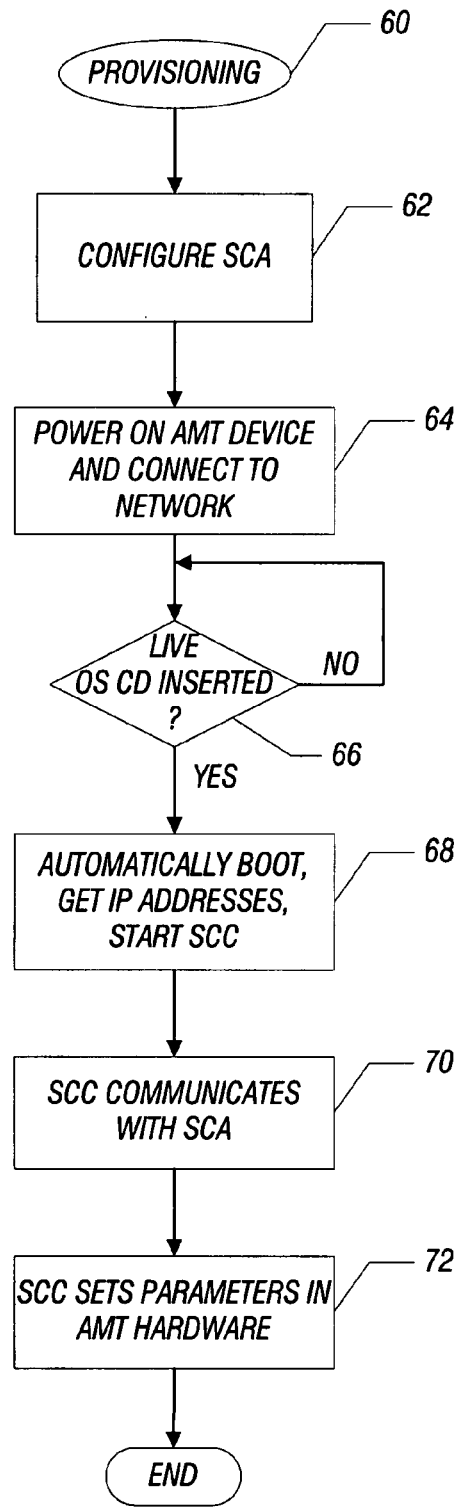
FIG. 2 is a flow chart for the embodiment shown in FIG. 1.

The LAN hardware 26 is coupled by the network connection 42 to the server 12. In order to provision and configure the set up and configuration application, the application is configured with the predefined parameters using the live operating system compact disk. Those predefined parameters include a certificate, a random number generator seed, and access control lists (ACLs) for the active management technology management security, as indicated in block 62 (FIG. 2). The active management technology device is powered on and connected to the network, as indicated in block 64. A technician then inserts the live operating system compact disk into a compact disk player. The operating system from the disk is automatically booted and gets an Internet Protocol address from a Dynamic Host Configuration Protocol (DHCP) server and an SCA server Internet Protocol address from a domain name system (DNS). Then, the set up and configuration client application is started by the script, as indicated in block 68.

Next, as indicated in block 70, the set up and configuration client application 44 communicates with the set up and configuration application 18 by a TLS connection and gets the predefined management security parameters. The set up and configuration client application 44 then sets the parameters into the active management technology hardware through the host embedded control interface driver 28, as indicated in block 72.

After successful provisioning, the active management technology device 10 is rebooted and the live operating system compact disk may be removed. Then, the active management technology device 10 can be connected by an appropriate third party active management technology management console remotely and securely.

In accordance with some embodiments of the present invention, the support and provisioning of the active management technology engine firmware may be offloaded to the host software. The operating system from the live operating system disk and the system central processing unit can use more secure TLS protocols instead of TLS-pre-shared key (PSK) protocols during the provisioning phase. They can also use the more secure Kerberos authentication instead of the weaker HTTP digest authentication during provisioning. Some embodiments may more easily add, modify, enhance, and extend features and functionalities on the set up and configuration client program than on the management engine firmware, making it easier to achieve zero touch active management technology set up and configuration.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable medium storing instructions that, when executed, enable a computer to:
   use an operating system, a set up and configuration client application, and a host embedded controller interface device driver, stored on an external storage device, to set up and configure an active management technology device;
   use the operating system to automatically boot and to obtain Internet Protocol addresses; and
   automatically set operation parameters using the set up and configuration client application and the host embedded controller interface device driver for an active management technology device.

2. The medium of claim 1 further storing instructions to enable the computer to use an operating system stored on a disk.

3. The medium of claim 2 further storing instructions to enable the computer to use a live operating system on said disk.

4. The medium of claim 3 further storing instructions to enable the computer to automatically boot said live operating system after insertion of said disk.

5. The medium of claim 4 further storing instructions to enable the computer to offload provisioning of the active management technology device to host software.

6. The medium of claim 1 further storing instructions to enable operator involvement to end after disk insertion.

7. A computer system comprising:
   an active management technology device; and
   an external storage device storing an operating system, a set up and configuration client application, and a host embedded controller interface device driver, to set up and configure an active management technology device, said operating system to automatically boot the computer system, to obtain Internet Protocol addresses and to automatically set parameters for operation of the active management technology device, using the set up and configuration client application and the host embedded controller interface device driver.

8. The system of claim 7 wherein said external storage device is a disk drive.

9. The system of claim 7 wherein said operating system is a live operating system.

10. The system of claim 9, said live operating system to automatically boot said system after insertion of a disk.

11. The system of claim 10 which is bootable without operator involvement other than inserting a disk.

* * * * *